(12) United States Patent
Sawada et al.

(10) Patent No.: US 7,572,021 B2
(45) Date of Patent: Aug. 11, 2009

(54) LED UNIT WITH ANNULAR MOUNTING STRUCTURE AND MOUNTING METHOD THEREOF

(75) Inventors: Yukio Sawada, Tochigi (JP); Yoshifumi Fujisaki, Tokyo (JP)

(73) Assignee: Hoya Corporation, Tokyo (JP)

( * ) Notice: Subject to any disclaimer, the term of this patent is extended or adjusted under 35 U.S.C. 154(b) by 195 days.

(21) Appl. No.: 11/627,437

(22) Filed: Jan. 26, 2007

(65) Prior Publication Data

US 2007/0177385 A1   Aug. 2, 2007

(30) Foreign Application Priority Data

Jan. 27, 2006   (JP) .............................. 2006-019183

(51) Int. Cl.
*G03B 15/03* (2006.01)
*F21V 17/10* (2006.01)
*F21V 21/30* (2006.01)

(52) U.S. Cl. .................. 362/18; 362/421; 362/366; 362/287; 362/282; 396/175; 396/176; 348/371

(58) Field of Classification Search ................ 362/421, 362/282, 285, 287, 366, 18; 396/175, 176; 348/371
See application file for complete search history.

(56) References Cited

U.S. PATENT DOCUMENTS

| | | | | |
|---|---|---|---|---|
| 243,780 A | * | 7/1881 | Jennings ..................... | 362/477 |
| 1,408,149 A | * | 2/1922 | Vallot ......................... | 362/368 |
| 1,739,641 A | * | 12/1929 | Lessmann ................... | 362/421 |
| 2,128,461 A | * | 8/1938 | Johnson ...................... | 362/549 |
| 2,504,866 A | * | 4/1950 | Morse ......................... | 362/477 |
| 2,800,575 A | * | 7/1957 | Robertson et al. ........... | 362/477 |
| 2,999,150 A | * | 9/1961 | Kallel ......................... | 362/547 |
| 3,679,890 A | * | 7/1972 | Pool ........................... | 362/275 |
| 3,803,400 A | * | 4/1974 | Ozawa ........................ | 362/372 |
| 4,142,227 A | * | 2/1979 | Aikens ........................ | 362/480 |
| 4,445,163 A | * | 4/1984 | Ziaylek, Jr. ................. | 362/287 |
| 4,499,528 A | * | 2/1985 | Hawlitzki ................... | 362/275 |
| 6,371,628 B1 | * | 4/2002 | Ward .......................... | 362/287 |

FOREIGN PATENT DOCUMENTS

JP   3228859   9/2001

* cited by examiner

*Primary Examiner*—Ismael Negron
(74) *Attorney, Agent, or Firm*—Greenblum & Bernstein, P.L.C.

(57) ABSTRACT

A mounting structure of an LED includes an LED unit including an LED, a lens element in front of the LED, and a collar around the lens element; a support member including a through-hole through which the lens element of the LED unit is exposed and an annular portion; an annular contacting surface formed on one of the annular portion as an annular concave surface and the collar as an annular convex surface; an annular contacting portion, formed on the other of the annular portion and the collar, wherein an orientation of the LED unit is adjusted by changing a relative contacting position between the annular contacting surface and the annular contacting portion; and a fixing device which fixes the LED unit to the support member while maintaining the contacting position of the annular contacting surface and the annular contacting portion after the adjustment.

15 Claims, 7 Drawing Sheets

LED UNIT WITH ANNULAR MOUNTING STRUCTURE AND MOUNTING METHOD THEREOF

BACKGROUND OF THE INVENTION

1. Field of the Invention

The present invention relates to a structure and a method for mounting an LED to an apparatus such as a camera.

2. Description of the Prior Art

When an LED unit which includes an LED (light-emitting diode) and a lens element positioned immediately in front of the LED is mounted to another component or product, no adjustment is formerly made to the orientation of the LED unit; conventionally, the LED unit is merely fixed to a mounting portion formed on such a component or a product. Upon the LED unit being fixed to the mounting portion of such a component or a product, the LED unit is pointed in a fixed direction. Therefore, if the LED unit emits light precisely in a designed direction, the light thus emitted travels in a desired direction.

Such a conventional mounting structure is disclosed in Japanese Patent No. 3228859.

As described above, the orientation of the LED unit does not have to be adjusted when being mounted to another component or product if the LED unit emits light precisely in a designed direction.

However, for instance, the manufacturing tolerances of low-cost LED units vary widely (due to, e.g., positional deviations of the lenses relative to the LEDs in the LED units), and accordingly, it is often the case that the light-emitting directions of the low-cost LED units are mutually different depending on the LED unit. Therefore, in the case where this low-cost type of LED unit is mounted to another component or product, the orientation of the LED unit needs to be adjusted.

However, there is no structure or mechanism known in the art which allows the LED unit to be mounted to another component or product while allowing an adjustment of the orientation of the LED unit.

SUMMARY OF THE INVENTION

The present invention provides a mounting structure and a mounting method of an LED, each of which makes it possible to mount the LED unit to another component or product while making an adjustment to the orientation of the LED unit.

According to an aspect of the present invention, a mounting structure of an LED is provided, including an LED unit including an LED, a lens element positioned immediately in front of the LED, and a collar positioned around the lens element; a support member including a through-hole through which the lens element of the LED unit is exposed and an annular portion surrounding the through-hole, the annular portion being in contact with the collar of the LED unit; an annular contacting surface formed on one of an inner peripheral surface of the annular portion as an annular concave surface and an outer peripheral surface of the collar as an annular convex surface; an annular contacting portion, formed on the other of the inner peripheral surface of the annular portion and the outer peripheral surface of the collar, wherein the annular contacting portion and the annular contacting surface are in slidable contact so that an orientation of the LED unit is adjusted by changing a relative contacting position between the annular contacting surface and the annular contacting portion; and a fixing device which fixes the LED unit to the support member while maintaining the contacting position of the annular contacting surface and the annular contacting portion after the adjustment.

It is desirable for the annular contacting portion to include a second annular contacting surface formed on the other of the inner peripheral surface of the annular portion as an annular concave surface and the outer peripheral surface of the collar as an annular convex surface.

It is desirable for the annular concave surface and the annular convex surface to be respectively formed as parts of spherical surfaces having the same radius.

It is desirable for the fixing device to include an ultraviolet cure adhesive.

The collar can be made of a translucent material or a transparent material. This makes it possible to cure the UV cure adhesive while allowing ultraviolet rays pass through the collar.

It is desirable for the support member to be fixed to a camera body in a manner to allow the lens element to be exposed at the front of the camera body.

It is desirable for the LED to serve as an AF auxiliary light source.

It is desirable for the LED unit to include an LED holder which holds the LED and to which the lens element is fixed, the collar being fixed to the LED holder.

It is desirable for a flexible printed wiring board to be fixed at one end thereof to the LED holder.

It is desirable for the annular contacting portion to be formed as an annular contacting edge which is in linear contact with the annular contacting surface.

It is desirable for the mounting structure of the LED to be adapted for use in a camera.

It is desirable for the LED to serve as an auxiliary light source for autofocus.

In an embodiment, a mounting structure of an LED is provided, including an LED unit including an LED, a lens element positioned immediately in front of the LED, and an annular convex collar positioned around the lens element; a support member including a through-hole through which the lens element of the LED unit is exposed and an annular concave portion surrounding the through-hole, the annular concave portion being in contact with the annular convex collar of the LED unit; wherein the annular convex collar and the annular concave portion are in slidable contact so that an orientation of the LED unit is adjusted by changing a relative contacting position between the annular convex collar and the annular concave portion; and a fixing device which fixes the LED unit and the support member while maintaining the contacting position of the annular convex collar and the annular concave portion after the adjustment.

In an embodiment, a method of mounting an LED unit to a support member while adjusting orientation of the LED unit is provided, wherein the LED unit includes an LED, a lens element positioned immediately in front of the LED, and a collar positioned around the lens, and wherein the support member includes a through-hole through which the lens element of the LED unit is exposed and an annular portion surrounding the through-hole, the annular portion being in contact with the collar of the LED unit, the mounting method including adjusting the orientation of the LED unit by making an annular contacting surface, which is formed on one of an inner peripheral surface of the annular portion as an annular concave surface and an outer peripheral surface of the collar as an annular convex surface, and an annular contacting portion, which is formed on the other of the inner peripheral surface of the annular portion and the outer peripheral surface of the collar, slide on each other while changing a relative contacting position therebetween; and fixing the LED unit to the support member while maintaining a state of contact between the annular contacting surface and the annular contacting portion after the LED unit is directed toward a desired direction.

It is desirable for the fixing step to include applying a UV cure adhesive between the annular contacting surface and the annular contacting portion; and curing the UV cure adhesive by applying ultraviolet rays to the UV cure adhesive.

According to the present invention, the light emitted from the LED unit can be directed toward a desired direction even if the LED unit does not emit light precisely in a designed direction because the orientation (angle) of the LED unit can be easily adjusted via the annular contacting portion and the annular contacting surface, the diameter of which decreases in a direction from the rear to the front of the LED unit.

Furthermore, the production cost can be kept to a minimum because the orientation adjusting mechanism (mounting structure of an LED unit) according to the present invention is a simple mechanism that uses the annular contacting surface and the annular contacting portion.

The present disclosure relates to subject matter contained in Japanese Patent Application No. 2006-19183 (filed on Jan. 27, 2006), which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of a mounting structure of an LED according to the present invention will be hereinafter discussed with reference to FIGS. 1 through 5.

Figure 1:
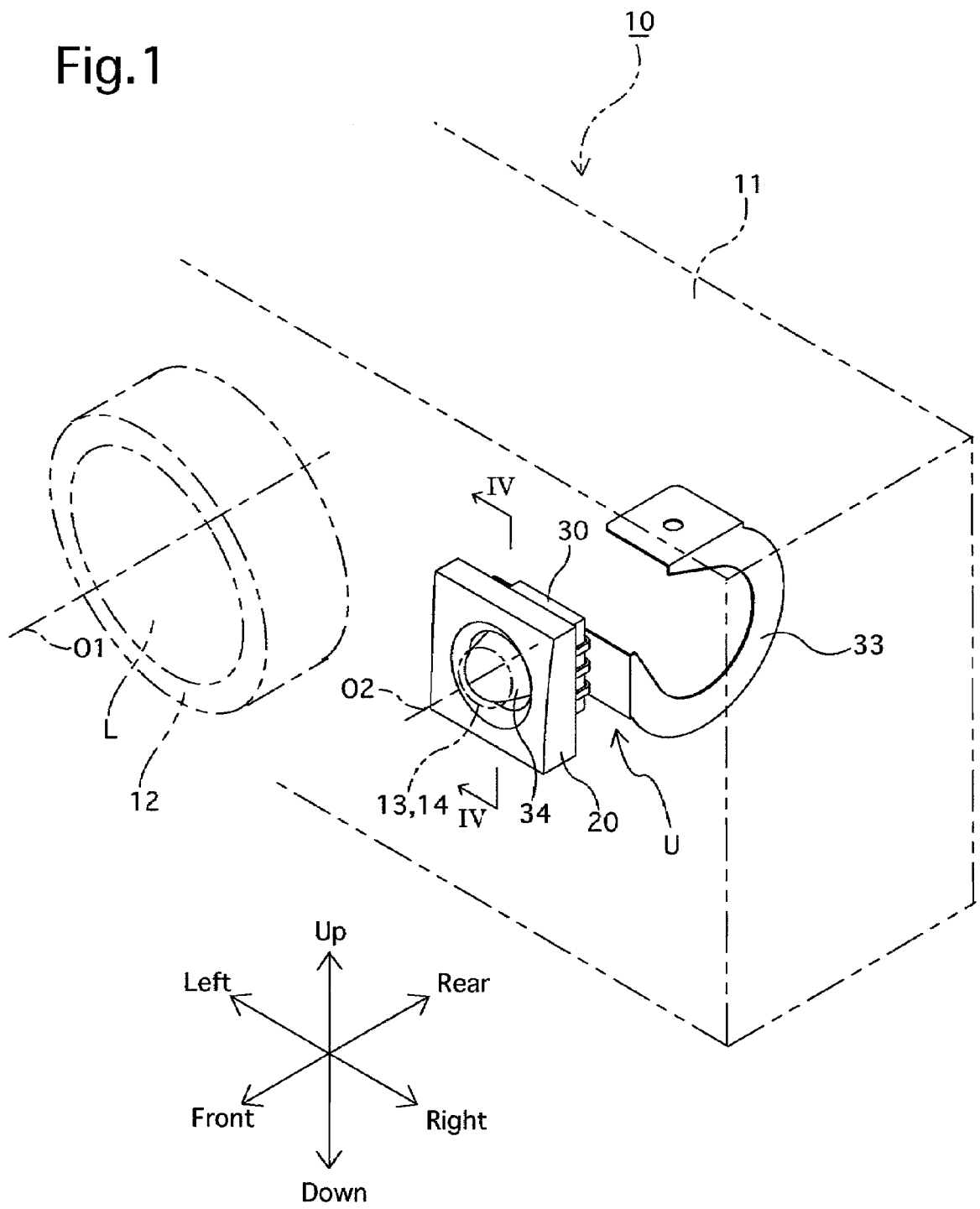
FIG. 1 is a front perspective view of a part of a camera to which a first embodiment of a mounting structure of an LED unit according to the present invention is applied.

The first embodiment is applied to a camera 10. As shown in FIG. 1, the camera 10 is provided on the front of a camera body 11 thereof with a lens barrel 12 which contains a photographic lens L having a plurality of lens groups along a common optical axis O1 thereof. The camera body 11, which is made as a hollow body, is provided on a front wall thereof at a right part thereon, as viewed in FIG. 1, with a circular hole (through-hole) 13 (shown by a chain line in FIG. 1). A glass cover 14 made of a translucent material (or a transparent material) and having substantially the same shape as the circular hole 13 is fixedly fitted in the circular hole 13.

Figure 2:
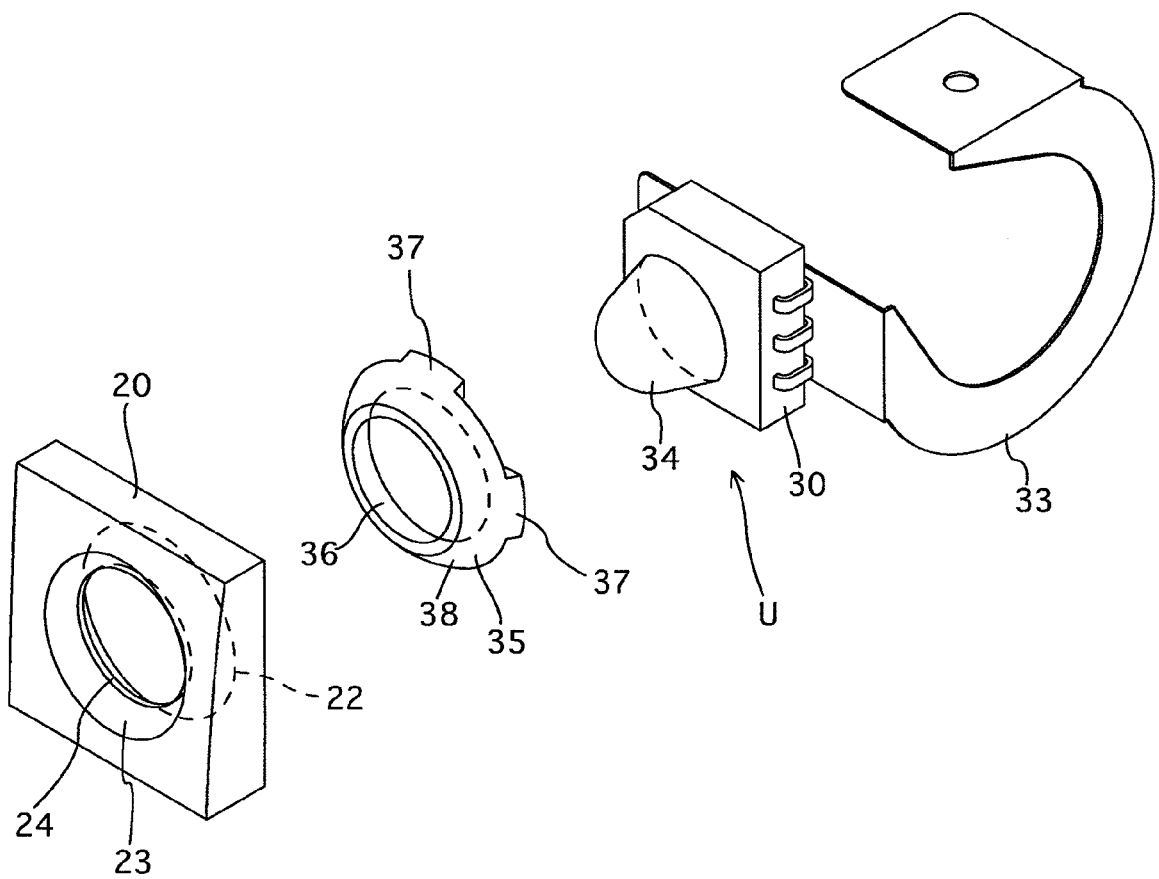
FIG. 2 is an exploded front perspective view of an LED unit and associated peripheral elements thereof.
Figure 3:
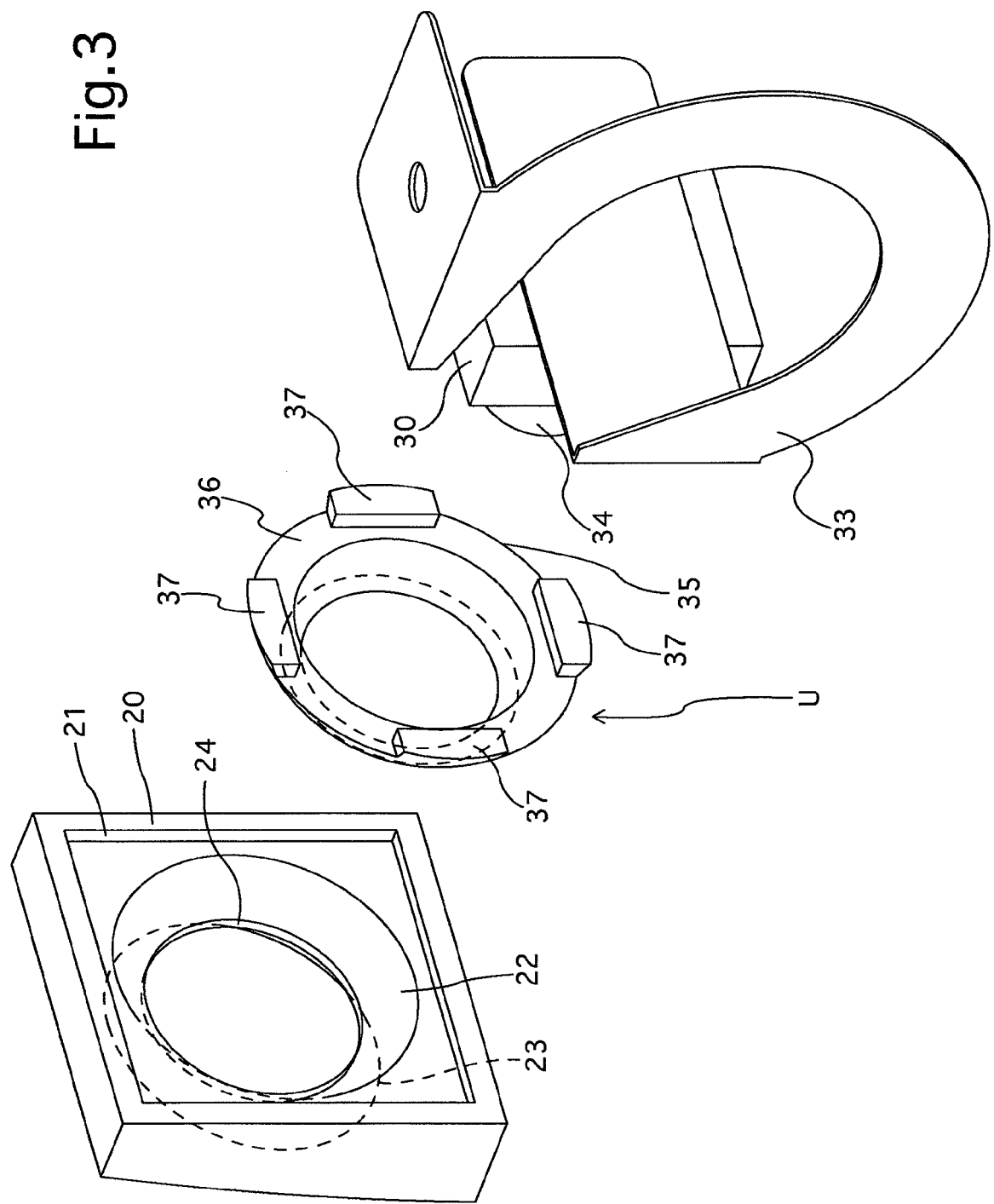
FIG. 3 is an exploded rear perspective view of the elements shown in FIG. 2.
Figure 4:
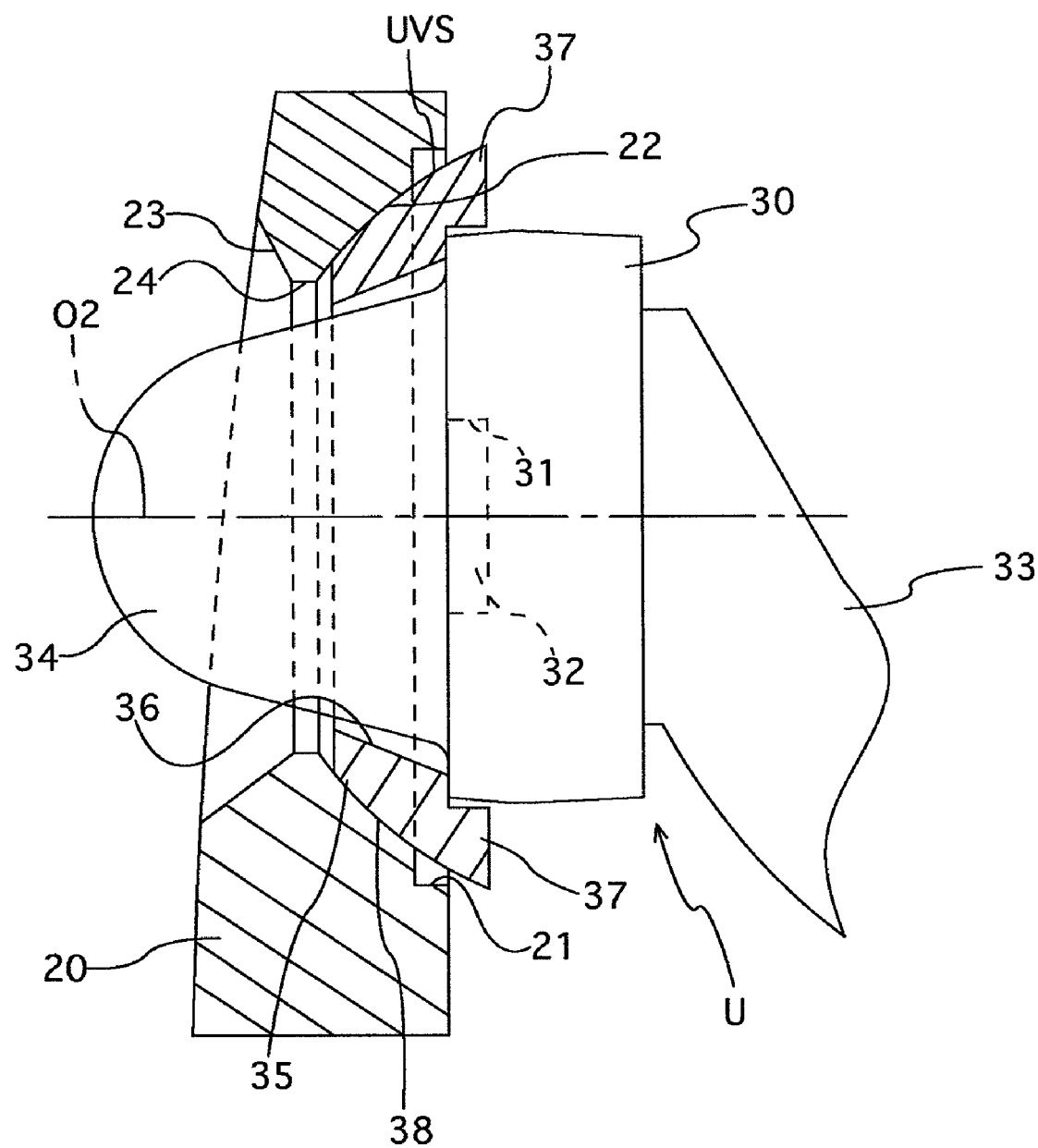
FIG. 4 is a cross sectional view taken along the IV-IV line shown in FIG. 1.

As shown in FIG. 1, the camera 10 is provided, inside the camera body 11 around the circular hole 13, with a support member 20 which is fixed to a rear surface (internal surface) of the front wall of the camera body 11 at a right part thereon as viewed in FIG. 1. As shown in FIGS. 2 through 4, the support member 20 is square in shape as viewed from the front, and is provided on the back of the support member 20 with a square recess 21 as viewed from the front. The support member 20 is provided in the square recess 21 with a first annular contacting surface (annular contacting surface/annular portion/annular concave surface) 22 formed as a curved surface, the diameter of which decreases in a direction from the rear to the front of the support member 20 (from right to left as viewed in FIG. 4). Specifically, the first annular contacting surface 22 is shaped as a part of a spherical surface. The support member 20 is provided on the front surface thereof with a tapered surface (annular surface) 23, the diameter of which decreases in a direction from the front to the rear of the support member 20. In addition, the support member 20 is provided between the first annular contacting surface 22 and the tapered surface 23 with a connecting hole 24 via which the tapered surface 23 and the first annular contacting surface 22 are communicatively connected. The square recess 21, the first annular contacting surface 22, the tapered surface 23 and the connecting hole 24 are elements of a supporting through-hole.

The first embodiment of the mounting structure of the LED is provided with an LED unit U. The LED unit U will be discussed hereinafter.

As shown in FIG. 4, an LED holder 30 is provided on the front surface thereof with a mounting recess 31 into which an LED 32 is fixedly fitted. An end of a flexible printed wiring board 33, the other end of which is connected to a power source (not shown), is connected to a rear surface of the LED holder 30 to be electrically connected to the LED 32. The LED 32 emits light upon an electric current being passed through the LED 32 through the flexible printed wiring board 33. A collimating lens (lens element) 34 is fixed to the front of the LED holder 30 so that the light emitted by the LED 32 exits from the LED unit U as parallel rays of light through the collimating lens 34 having an optical axis O2. The light emitted by the LED 32 and passed through the collimating lens 34 exits from the collimating lens 34 along the optical axis O2 and is used as AF (autofocus) auxiliary light.

The camera 10 is provided with a collar 35 which is an annular member made of a translucent material (or a transparent material). A rear surface of the collar 35 is fixed to a front surface of the LED holder 30. As shown in the drawings, the collar 35 is positioned around the collimating lens 34. The collar 35 is provided with a through-hole 36, the diameter of which decreases in a direction toward the front thereof. The collar 37 is provided, on the rear end surface thereof at substantially equi-angular intervals, with four projections 37 which are positioned around the periphery of the LED holder 30. The outer peripheral surface of the collar 35 is formed as a second annular contacting surface (annular contacting portion/annular convex surface) 38 that is shaped as a curved surface the diameter of which decreases in a direction from the rear toward the front of the collar 35 (from right to left as viewed in FIG. 4). The second annular contacting surface 38 is shaped as a part of a spherical surface which is identical in curvature to the first annular contacting surface 22.

The LED holder 30, the LED 32, the flexible printed wiring board 33, the collimating lens 34 and the collar 35 constitute the LED unit U.

The procedure of mounting the LED unit U to the support member 20 while making an adjustment to the orientation of the LED unit U will be discussed hereinafter.

First of all, a chart (not shown) is positioned in front of the camera 10 (e.g., at a location approximately two meters away from the camera 10) on an extension line of the optical axis O1 of the photographic lens L in advance. Subsequently, a UV (ultraviolet) cure adhesive UVS (fixing device) is placed on the entire second annular contacting surface 38 of the collar 35 of the LED unit U. Thereafter, the LED unit U is brought closely to the support member 20 from behind, and then the collimating lens 34 is inserted into the connecting hole 24 and the tapered surface (tapered hole) 23 of the support member 20 while the second annular contacting surface 38 of the collar 35 is brought into contact with the first annular contacting surface 22 of the support member 20. At this time, the UV cure adhesive UVS applied to the second annular contacting surface 38 is adhered to the first annular contacting surface 22.

In this state, upon the LED 32 being turned ON to emit light forward through the collimating lens 34, this light passes through the glass cover 14 and illuminates the aforementioned chart. Thereupon, the orientation (angle) of the entire LED unit U is manually adjusted so that the light which is emitted from the collimating lens 34 and incident on the chart so as to be formed as a light spot thereon overlays the optical axis O1 on the chart. Although the relative contacting position between the first annular contacting surface 22 and the second annular contacting surface 38 varies by changing the orientation of the LED unit U, the orientation of the LED unit U can be adjusted smoothly with stability since the first annular contacting surface 22 and the second annular contacting surface 38 are in surface contact with each other at all times during the adjustment.

Figure 5:
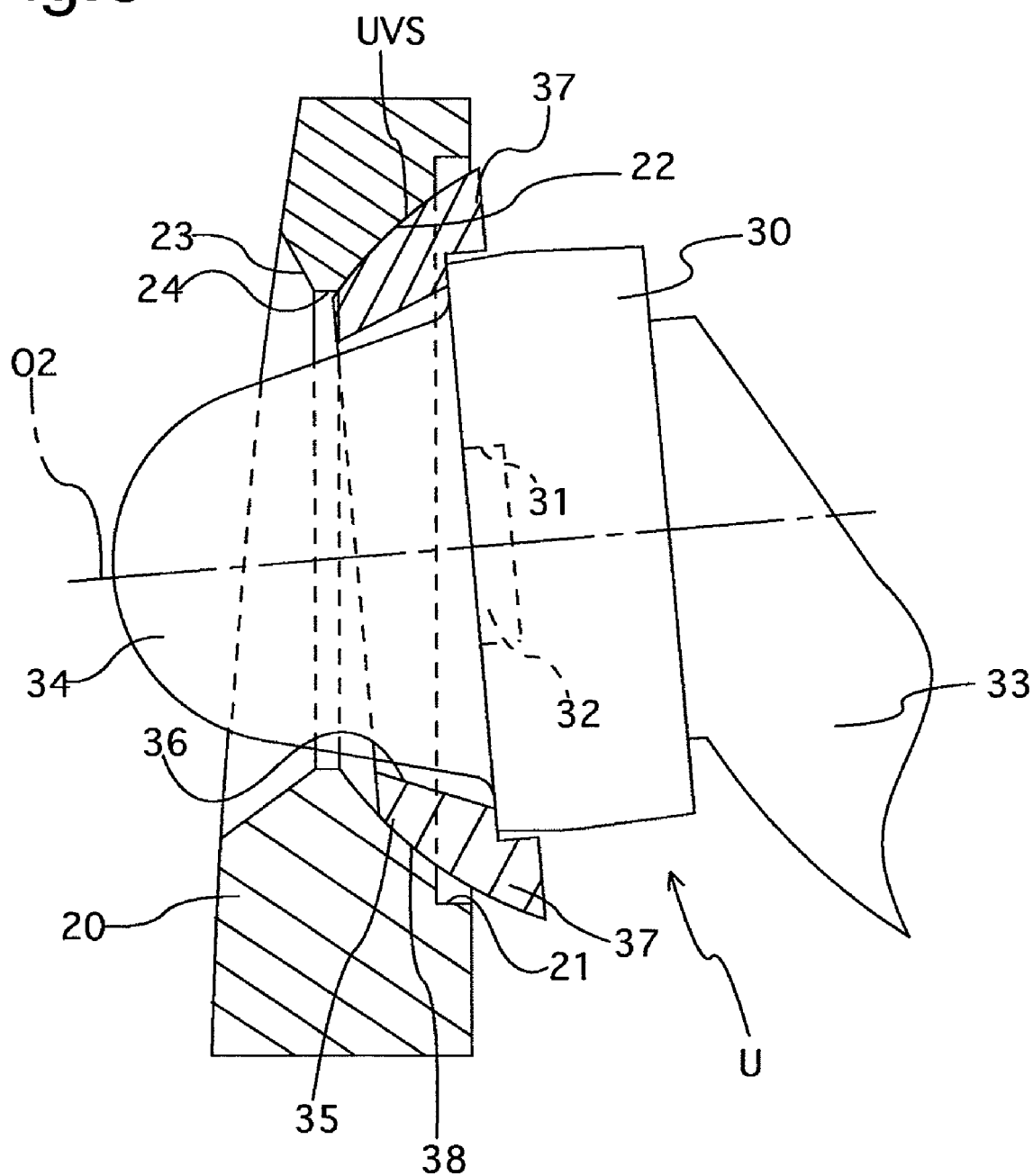
FIG. 5 is a view similar to that of FIG. 4 and illustrates a state where an adjustment has been made to the orientation of the LED unit.

Subsequently, for instance, when the aforementioned light spot overlays the optical axis O1 on the chart upon the LED unit U being orientated as shown in FIG. 5, this orientation of the LED unit U (the position of the LED unit U relative to the support member 20) is held (maintained). At this time, the orientation of the LED unit U (the position of the LED unit U relative to the support member 20) can be easily held (maintained) since the first annular contacting surface 22 and the second annular contacting surface 38 are in surface contact with each other. Subsequently, ultraviolet rays are applied to the collar 35 from an ultraviolet light emitter (not shown) positioned behind the collar 35. Since the collar 35 is made of a translucent material (or a transparent material), the ultraviolet rays incident on the collar 35 pass therethrough to be applied to the UV cure adhesive UVS. Therefore, the UV cure adhesive UVS is cured, so that the support member 20 and the collar 35 are adhered to each other by the UV cure adhesive UVS thus cured. If the LED unit U is fixed to the support member 20 in this manner, the collimating lens 34 is exposed at the front of the camera body 11 through the glass cover 14.

As described above, according to the above illustrated embodiment, even if the LED unit U cannot emit light precisely in a designed direction, the light which is emitted from the collimating lens 34 and incident on the chart so as to be formed as a light spot thereon can be easily made to overlay the optical axis O1 on the chart since the orientation of the LED unit U (the position of the LED unit U relative to the support member 20) can be easily adjusted with the aid of the first annular contacting surface 22 and the second annular contacting surface 38 that are respectively formed as parts of two spherical surfaces having the same radius.

Moreover, the production cost can be kept to a minimum since the above illustrated embodiment of the orientation adjusting mechanism (mounting structure of an LED unit) is a simple mechanism that uses the first annular contacting surface 22 and the second annular contacting surface 38.

Furthermore, since the first annular contacting surface 22 and the second annular contacting surface 38 are in surface contact with each other and the UV cure adhesive UVS is applied to these two contacting surfaces, the first annular contacting surface 22 and the second annular contacting surface 38 can be firmly bonded to each other more securely than the case where two contacting surfaces are in point contact with each other.

Furthermore, since the second annular contacting surface 38 of the collar 35 that is positioned around the collimating lens 34 is in contact with the first annular contacting surface 22, rather than a peripheral surface of the collimating lens 34 being in contact with the first annular contacting surface 22, there is no possibility of the collimating lens 34 being scratched when the LED unit U is fixed to the support member 20.

A second embodiment of the mounting structure of the LED according to the present invention will be hereinafter discussed with reference to FIGS. 6 and 7. Elements of the second embodiment of the mounting structure of the LED which are similar to those of the first embodiment of the mounting structure of the LED are designated by the same reference numerals, and a detailed description for such elements is omitted from the following description.

Figure 6:
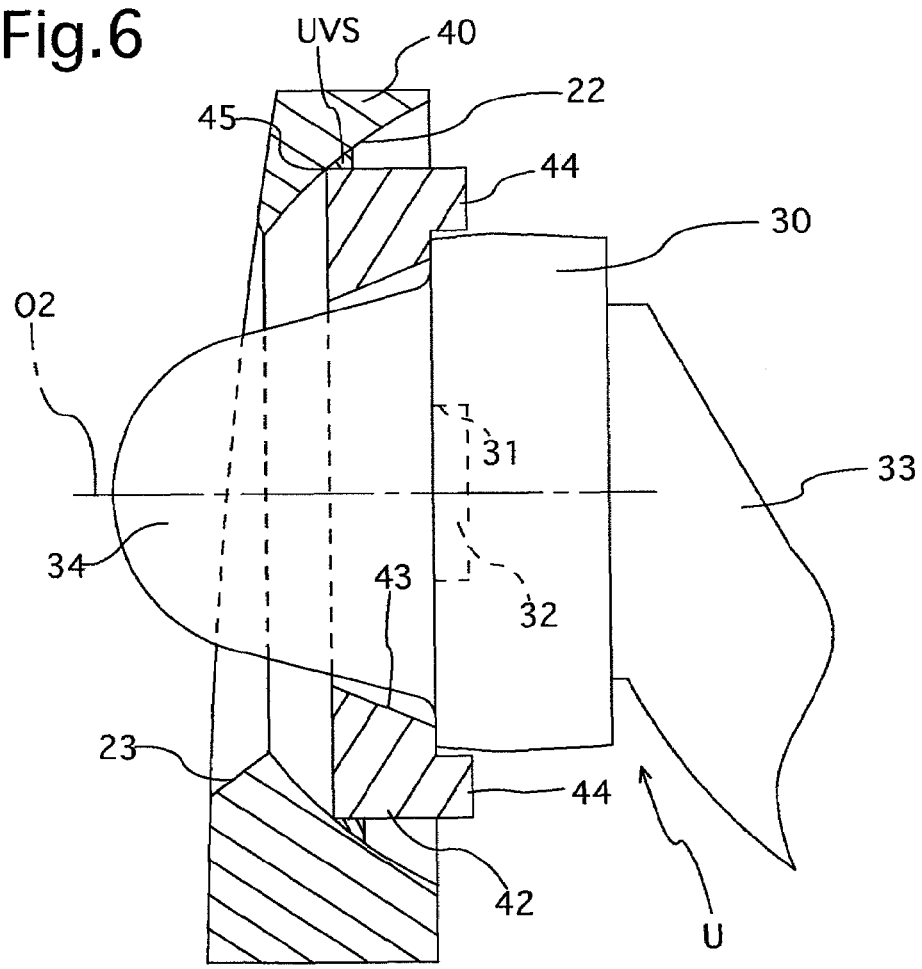
FIG. 6 is a view similar to that of FIG. 4 and illustrates a second embodiment of the mounting structure of the LED unit.
Figure 7:
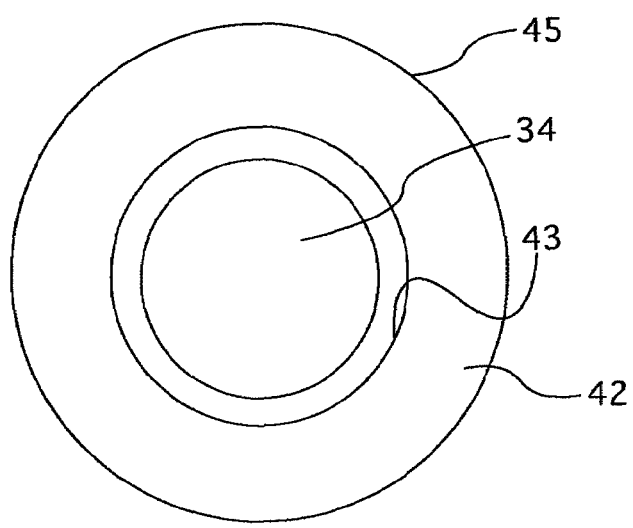
FIG. 7 is a front view of the LED unit shown in FIG. 6.

In this embodiment shown in FIGS. 6 and 7, the camera 10 is provided, inside the camera body 11 around the circular hole 13, with a support member 40 which corresponds to the support member 20 of the first embodiment. The support member 40 is provided, on a rear surface and a front surface thereof, with a first annular contacting surface 22 and a tapered surface 23 (which are similar to those of the first embodiment of the mounting structure of the LED, respectively) which is communicatively connected to the first annular contacting surface 22.

A collar 42 which corresponds to the collar 35 is used as an element of the LED unit U in the second embodiment of the mounting structure of the LED. The collar 42 is in the shape of substantially a cylindrical column and made of a translucent material (or a transparent material). A rear surface of the collar 42 is fixed to a front surface of the LED holder 30. The collar 42 is provided with a through-hole 43 and four projections 44 (only two of them are shown in FIG. 6). A front outer edge of the collar 42 that is formed between the front surface of the collar 42 and the outer peripheral surface thereof serves as an annular contacting portion (annular contacting edge) 45 capable of being in sliding contact with the first annular contacting surface 22 of the support member 40.

In the second embodiment of the mounting structure of the LED, the orientation of the LED unit U can be adjusted by making the annular contacting portion 45 of the collar 42 in contact with the first annular contacting surface 22 and changing the relative contacting position between the annular contacting portion 45 and the first annular contacting surface 22. Thereafter, the LED unit U can be fixed to the support member 40 with the LED unit U being directed toward a desired direction if firstly the LED unit U is held (maintained) after the LED unit U is directed toward the desired direction, subsequently the UV cure adhesive UVS is applied into a wedge-shaped space formed between the support member 40 and the collar 42, and subsequently ultraviolet rays are applied to the UV cure adhesive UVS.

Furthermore, since the annular contacting portion 45 of the collar 42 is entirely in linear contact with the first annular contacting surface 22 whichever direction the LED unit U may be directed, the orientation of the LED unit U can be adjusted smoothly with stability; moreover, the orientation of the LED unit U (the position of the LED unit U relative to the support member 40) can be easily held (maintained).

In addition, in the second embodiment of the mounting structure of the LED, the UV cure adhesive UVS can be easily applied between the support member 40 and the collar 42 because the aforementioned wedge-shaped space, which is formed between the support member 40 and the collar 42, can be provided wider than in the case of the first embodiment of the mounting structure of the LED; moreover, since ultraviolet rays can be applied to the UV cure adhesive UVS from behind thoroughly to a sufficient degree, the collar 42 does not necessarily have to be transparent or translucent, which makes it possible for the collar 42 to be made of a low-cost material.

Furthermore, in the second embodiment of the mounting structure of the LED, since the support member 40 and the collar 42 are fixed to each other by the UV cure adhesive UVS which is poured into the aforementioned wedge-shaped space, the adhesive to be used for bonding the support member 40 and the collar 42 to each other is not limited solely to the UV cure adhesive UVS, but can alternatively be a low-cost adhesive.

A third embodiment of the mounting structure of the LED according to the present invention will be hereinafter discussed with reference to FIG. 8. Elements of the third embodiment of the mounting structure of the LED which are similar to those of the first embodiment of the mounting structure of the LED are designated by the same reference numerals, and a detailed description for such elements is omitted from the following description.

Figure 8:
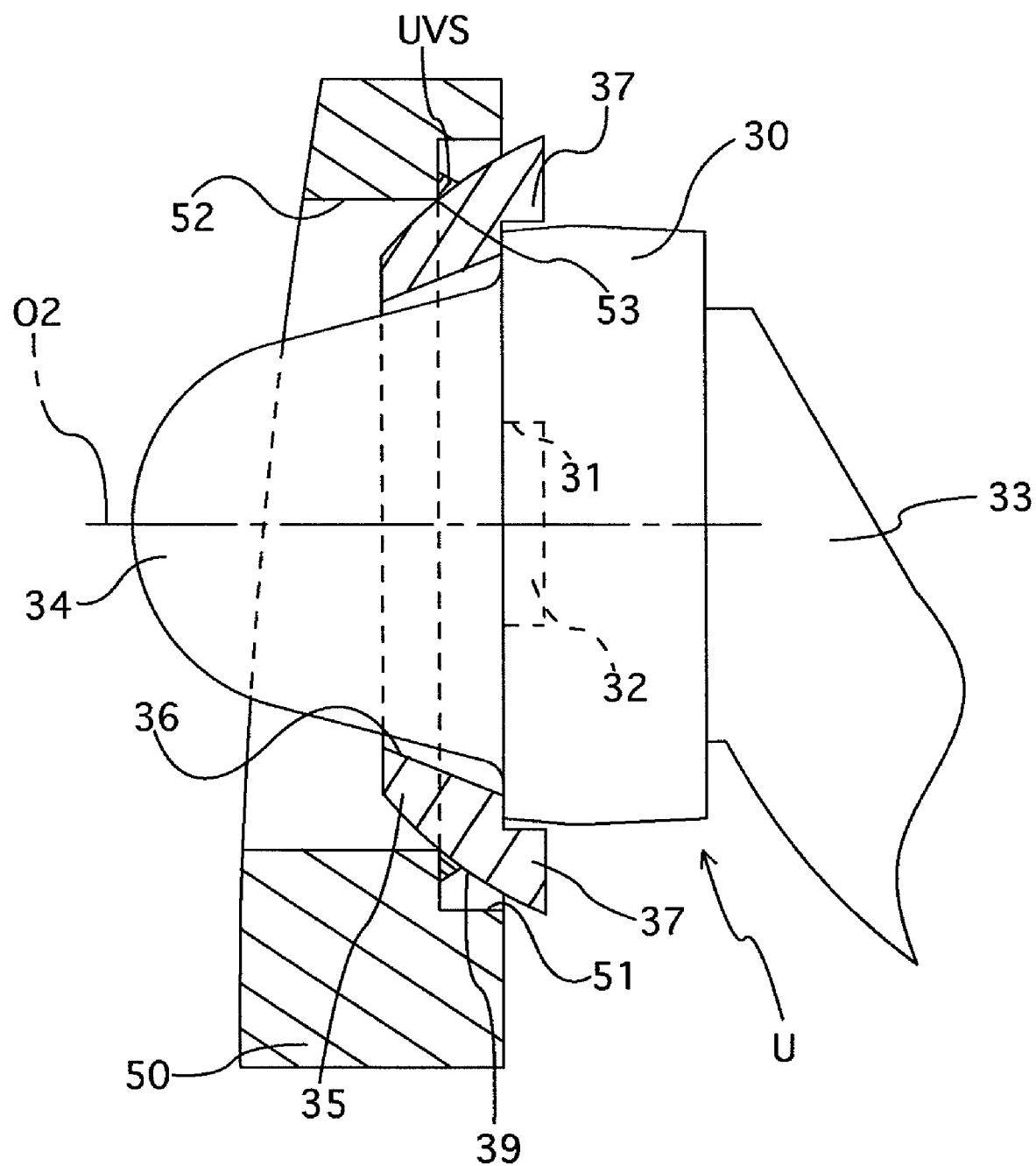
FIG. 8 is a view similar to that of FIG. 4 and illustrates a third embodiment of the mounting structure of the LED unit.

In this embodiment shown in FIG. 8, the camera 10 is provided, inside the camera body 11 around the circular hole 13, with a support member 50 which corresponds to the support member 20 of the first embodiment.

The support member 50 is provided on the back thereof with a square recess 51. The support member 50 is further provided on the front thereof with a supporting through-hole 52 having a circular shape in cross section which is communicatively connected with the square recess 51. The diameter of the supporting through-hole 52 is constant in the forward/rearward direction (horizontal direction as viewed in FIG. 8). The support member 50 is provided at the rear end of the supporting through-hole 52 with an annular contacting portion (annular contacting edge/annular portion) 53 which is circular in shape as viewed from the front. The annular contacting portion 53 is capable of being in sliding contact with an annular contacting surface (annular convex surface) 39 of the collar 35, which is identical in shape as the annular contacting surface 38 of the collar 35 of the first embodiment of the mounting structure of the LED.

In the third embodiment of the mounting structure of the LED, the orientation of the LED unit U can be adjusted by making the annular contacting portion 39 of the collar 35 in linear contact with the annular contacting portion 53 and changing the relative contacting position between the annular contacting portion 39 and the annular contacting portion 53. Thereafter, the LED unit U can be fixed to the support member 50 with the LED unit U being directed toward a desired direction if the LED unit U is firstly held (maintained) after the LED unit U is directed toward the desired direction, subsequently, the UV cure adhesive UVS is applied into the wedge-shaped space defined by the annular contacting portion 39, the square recess 51 and the annular contacting portion 53, and subsequently ultraviolet rays are applied to the UV cure adhesive UVS.

Furthermore, since the annular contacting portion 53 of the support member 50, which is provided at the rear end of the supporting through-hole 52, is entirely in linear contact with the annular contacting surface 39 whichever direction the LED unit U may be directed, the orientation of the LED unit U can be adjusted smoothly with stability; moreover, the orientation of the LED unit U (the position of the LED unit U relative to the support member 50) can be held (maintained) easily.

Furthermore, since the support member 50 does not have to be provided with any annular contacting surface, and since the front surface of the support member 50 does not have to be provided with a tapered surface, the support member 50 can be made easily at a low cost of production.

Although the present invention has been discussed with reference to the specific embodiments described above, the present invention is not limited solely thereto; various changes can be made in these specific embodiments without departing from the scope of the invention claimed.

For instance, it is possible that each of the first annular contacting surface 22, the second annular contacting surface 38 and the annular contacting surface 39 of the above described embodiments be each formed as an annular curved surface having a different shape from the first annular contacting surface 22, the second annular contacting surface 38 and the annular contacting surface 39, respectively, and the diameter of which decreases in a direction from the rear to the front. For instance, it is possible that the first annular contacting surface 22 of the first embodiment, the first annular contacting surface 22 of the second embodiment and the annular contacting surface 39 of the third embodiment be formed as a tapered surface (truncated conical surface), the diameter of which decreases in a direction from the rear to the front of the support member (20, 40 or 50).

Additionally, although the LED unit U is used as an AF auxiliary light source of the camera 10 in each of the above described first through third embodiments, the present invention is not limited solely thereto; the present invention can also be applied to the mounting structure of the LED used for any product or component other than the camera 10.

In addition, it is possible that the collar (35 or 42) and the collimating lens 34 in each of the above described first through third embodiments be molded as an integral member from a translucent material (or a transparent material). Furthermore, the collar 35 can be molded of a material other than a translucent material (or a transparent material) if an adhesive other than the UV cure adhesive UVS is used to fix the collar to the support member.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A mounting structure of an LED, comprising:

an LED unit comprising an LED, a lens element positioned immediately in front of said LED, and a collar positioned around said lens element;

a support comprising a through-hole through which said lens element of said LED unit is exposed and an annular portion surrounding said through-hole, said annular portion being in contact with said collar of said LED unit;

an annular contacting surface formed on one of an inner peripheral surface of said annular portion as an annular concave surface and an outer peripheral surface of said collar as an annular convex surface;

an annular contacting portion, formed on the other of said inner peripheral surface of said annular portion and said outer peripheral surface of said collar, wherein said annular contacting portion and said annular contacting surface are in slidable contact so that an orientation of said LED unit is adjusted by changing a relative contacting position between said annular contacting surface and said annular contacting portion; and a fixing device which fixes said LED unit to said support while maintaining said contacting position of said annular contacting surface and said annular contacting portion after said adjustment, said support being fixed to a camera body in a manner to allow said lens element to be exposed at a front of said camera body.

2. The mounting structure of the LED according to claim 1, wherein said fixing device comprises an ultraviolet cure adhesive.

3. The mounting structure of the LED according to claim 1, wherein said collar is made of a translucent material.

4. The mounting structure of the LED according to claim 1, wherein said collar is made of a transparent material.

5. The mounting structure of the LED according to claim 1, wherein said LED serves as an AF auxiliary light source.

6. The mounting structure of the LED according to claim 1, wherein said LED unit comprises an LED holder which holds said LED and to which said lens element is fixed, said collar being fixed to said LED holder.

7. The mounting structure of the LED according to claim 1, wherein a flexible printed wiring board is fixed at one end thereof to said LED holder.

8. The mounting structure of the LED according to claim 1, wherein said annular contacting portion is formed as an annular contacting edge which is in linear contact with said annular contacting surface.

9. The mounting structure of the LED according to claim 1, wherein said mounting structure of the LED is configured to be used in a camera.

10. The mounting structure of the LED according to claim 1, wherein said LED serves as an auxiliary light source for autofocus.

11. The mounting structure of the LED according to claim 1, wherein said annular contacting portion comprises a second annular contacting surface formed on said other of said inner peripheral surface of said annular portion as an annular concave surface and said outer peripheral surface of said collar as an annular convex surface.

12. The mounting structure of the LED according to claim 11, wherein said annular concave surface and said annular convex surface are respectively formed as parts of spherical surfaces having the same radius.

13. A mounting structure of an LED, comprising:
an LED unit including an LED, a lens element positioned immediately in front of said LED, and an annular convex collar positioned around said lens element;

a support comprises a through-hole through which said lens element of said LED unit is exposed and an annular concave portion surrounding said through-hole, said annular concave portion being in contact with said annular convex collar of said LED unit; wherein said annular convex collar and said annular concave portion are in slidable contact so that an orientation of said LED unit is adjusted by changing a relative contacting position between said annular convex collar and said annular concave portion; and a fixing device which fixes said LED unit and said support while maintaining said contacting position of said annular convex collar and said annular concave portion after said adjustments, said support being fixed to a camera body in a manner to allow said lens element to be exposed at a front of said camera body.

14. A method of mounting an LED unit to a support while adjusting orientation of said LED unit, wherein said LED unit comprises an LED, a lens element positioned immediately in front of said LED, and a collar positioned around said lens, and wherein said support comprises a through-hole through which said lens element of said LED unit is exposed and an annular portion surrounding said through-hole, said annular portion being in contact with said collar of said LED unit, said mounting method comprising:

adjusting said orientation of said LED unit by making an annular contacting surface, which is formed on one of an inner peripheral surface of said annular portion as an annular concave surface and an outer peripheral surface of said collar as an annular convex surface, and an annular contacting portion, which is formed on the other of said inner peripheral surface of said annular portion and said outer peripheral surface of said collar, slide on each other while changing a relative contacting position therebetween;

fixing said LED unit to said support while maintaining a state of contact between said annular contacting surface and said annular contacting portion after said LED unit is directed toward a desired direction; and fixing said support to a camera body such that said lens element is exposed at a front of said camera body.

15. The mounting method of the LED according to claim 14, wherein said fixing step comprises:
applying a UV cure adhesive between said annular contacting surface and said annular contacting portion; and curing said UV cure adhesive by applying ultraviolet rays to said UV cure adhesive.

* * * * *